United States Patent
Dundee et al.

(10) Patent No.: US 9,429,825 B2
(45) Date of Patent: Aug. 30, 2016

(54) MODULAR PROJECTOR CAGE AND STACKED FRAME USING SAME

(71) Applicant: Revolution Display, LLC, Glendale, CA (US)

(72) Inventors: Vincent Dundee, Glendale, CA (US); Chris Taylor, San Diego, CA (US); Marcus De Luco, Pasadena, CA (US)

(73) Assignee: Revolution Display, LLC, Glendale, CA (US)

( * ) Notice: Subject to any disclaimer, the term of this patent is extended or adjusted under 35 U.S.C. 154(b) by 0 days.

(21) Appl. No.: 14/490,035

(22) Filed: Sep. 18, 2014

(65) Prior Publication Data

US 2015/0083675 A1    Mar. 26, 2015

Related U.S. Application Data

(60) Provisional application No. 61/881,120, filed on Sep. 23, 2013.

(51) Int. Cl.
  *G03B 21/14* (2006.01)
  *F16M 13/00* (2006.01)
  *G03B 21/54* (2006.01)

(52) U.S. Cl.
  CPC ............ *G03B 21/145* (2013.01); *F16M 13/00* (2013.01); *G03B 21/54* (2013.01); *Y10T 29/49826* (2015.01)

(58) Field of Classification Search
  CPC .. G03B 21/145; G03B 21/142; G03B 21/54; F16M 13/00; F16M 11/12; F16M 11/04; H04N 9/3147; A47B 87/007; Y10T 29/49826
  USPC .......... 211/26; 248/317, 323, 324, 342, 343, 248/346.05, 346.06, 309.1, 316.8, 917, 919, 248/920, 921, 922, 923; 353/79, 100, 101, 353/119, 122
  See application file for complete search history.

(56) References Cited

U.S. PATENT DOCUMENTS 2,579,348 A    12/1951    Taylor
2,752,429 A    8/1973    Reed
(Continued)

FOREIGN PATENT DOCUMENTS

DE    102006040089 A1 *  2/2007    ........... F16M 11/045
JP    2000137288 A *    5/2000
WO    2007070497 A3    6/2007

OTHER PUBLICATIONS

Machine translation of DE 102006040089 A1 obtained from https://patentscope.wipo.int/search/en/detail.jsf?docId=DE104755094&recNum=1&maxRec=&office=&prevFilter=&sortOption=&queryString=&tab=PCTDescription (last viewed on Feb. 11, 2016).*

*Primary Examiner* — Basil Katcheves
*Assistant Examiner* — Theodore Adamos
(74) *Attorney, Agent, or Firm* — Downs Rachlin Martin PLLC

(57) ABSTRACT

A modular projector cage for operably supporting an optical projector and for forming a stacked frame using another identical modular projector cage is disclosed. The modular projector cage has a rectangular hexahedral open frame. A mounting plate is connected to a bottom section of the frame by first and second articulated elevation assemblies connected to respective sides of the mounting plate adjacent the mounting plate front end, and by a yaw assembly rotatably connected to the mounting plate adjacent the back end. The first and second articulated elevation assemblies are independently adjustable to adjust the elevation at each side of the plate so that the pitch and roll of the mounting plate can be adjusted. The yaw assembly adjusts the amount of yaw, which causes articulated movement of the first and second articulated elevation assemblies.

16 Claims, 12 Drawing Sheets

(56) References Cited

U.S. PATENT DOCUMENTS

| | | |
|---|---|---|
| 3,912,385 A | 10/1975 | Stokes et al. |
| 4,148,453 A | 4/1979 | Brantly |
| D259,454 S * | 6/1981 | Gudgel ........................ D16/235 |
| 4,526,337 A | 7/1985 | Viasmensky |
| 4,653,717 A | 3/1987 | Bergstrom |
| 5,631,715 A | 5/1997 | Kirkpatrick |
| 6,073,892 A | 6/2000 | Dittmer |
| 6,461,002 B1 * | 10/2002 | Su ................................ 353/119 |
| 6,491,401 B2 * | 12/2002 | Tachibana .................... 353/101 |
| 6,594,078 B2 | 7/2003 | Clifton |
| 6,814,449 B2 * | 11/2004 | Yamada et al. ................. 353/74 |
| 7,455,273 B2 | 11/2008 | Lonnqvist |
| 8,144,188 B2 | 3/2012 | Facius et al. |
| 8,337,026 B2 * | 12/2012 | Chen et al. ...................... 353/79 |
| 2004/0105655 A1 * | 6/2004 | Ciulla ............................. 386/46 |
| 2005/0236546 A1 * | 10/2005 | O'Neill ........................ 248/317 |
| 2006/0007411 A1 * | 1/2006 | Harrison et al. ............. 353/119 |
| 2007/0034770 A1 * | 2/2007 | Chiu ............................. 248/616 |
| 2009/0294619 A1 * | 12/2009 | David ........................... 248/324 |
| 2012/0193499 A1 * | 8/2012 | Lin et al. ................. 248/346.05 |
| 2012/0256071 A1 * | 10/2012 | Dittmer ........................ 248/323 |
| 2013/0221179 A1 | 8/2013 | Lin et al. |
| 2015/0198868 A1 * | 7/2015 | Sakurai et al. ....... G03B 21/145 |

* cited by examiner

MODULAR PROJECTOR CAGE AND STACKED FRAME USING SAME

CROSS-REFERENCE TO RELATED APPLICATIONS

This application claims priority under 35 USC §119(e) from U.S. Provisional Patent Application No. 61/881,120, filed on Sep. 23, 2013, and which is incorporated by reference herein.

FIELD

This disclosure relates to optical projectors and cages for optical projectors, and in particular to stackable modular cages for optical projectors that can form a stacked frame.

BACKGROUND

Optical projectors are used to project still or moving images onto a screen to achieve a variety of visual effects for a host of different venues. Example optical projectors include slide projectors, movie (cinemagraphic) projectors and digital projectors. In some applications, multiple optical projectors are used in a coordinated manner to form multiple images on a screen. In other applications, the multiple images are combined to form one large effective image, while in other cases a variety of different images or visual effects is formed. The use of multiple optical projectors is becoming increasingly popular in performance venues, such as concerts, athletic events, exhibits and performances in general to create large-scale visual effects.

When multiple optical projectors are used, they need to be arranged in an organized manner that allows for adjusting the orientation of each camera. Furthermore, for many venues, the optical projectors are brought onto the site and deployed, i.e., assembled and configured in a desired multi-optical-projector array, and then disassembled and removed from the site. In such cases, the assembly and disassembly process needs to be as simple and rapid as possible while also allowing for the quick adjustment of the orientation of each optical projector.

Furthermore, the orientation of each optical projector needs to be rapidly and easily adjustable so that each projector points in a desired direction. In particular, there is a need for accessible mechanisms that allow for rapid adjustment of the pitch, roll and yaw of the optical projectors so that the optical projectors can be set up quickly at the given venue.

SUMMARY

An aspect of the disclosure is a modular projector cage for operably supporting an optical projector. The modular projector cage includes: a rectangular hexahedral open frame having a bottom horizontal section; a mounting plate operably disposed on the bottom horizontal section and configured to adjustably support the optical projector, the mounting plate having first and second opposite sides and front and rear ends; first and second articulated elevation assemblies respectively operably connected to the mounting plate at the first and second opposite sides and adjacent the front end via respective first and second articulated mechanical connections each capable of articulated movement, the first and second articulated elevation assemblies being independently operable to adjust a pitch and a roll of the mounting plate; and a yaw assembly operably connected to the mounting plate adjacent the rear end to provide a yaw adjustment, wherein the yaw adjustment causes the articulated movement of the first and second articulated mechanical connections of the first and second articulated elevation assemblies.

Another aspect of the disclosure includes a modular projector cage for supporting an optical projector. The modular projector cage includes: a rectangular hexahedral open frame formed by tubes connected by corner fittings and having parallel top and bottom sections; a projector mounting plate configured to support the optical projector and having opposite sides and opposite front and rear ends; first and second articulated elevation assemblies respectively mechanically connected to the first and second sides of the mounting plate adjacent the front end by respective first and second articulated mechanical connections each capable of articulated movement, and mechanically connected to the bottom section, the first and second articulated elevation assemblies being independently adjustable via respective first and second threaded rods to adjust an amount of pitch and an amount of roll of the mounting plate; a yaw assembly operably connected to the rear end of the mounting plate via a mounting fixture having a threaded portion that engages a third threaded rod such that rotation of the third threaded rod generates an amount of a yaw of the mounting plate; and wherein generating the amount of yaw causes the articulated movement of the first and second articulated mechanical connections of the first and second articulated elevation assemblies.

Another aspect of the disclosure is a stacked frame, comprising: the modular projector cage as described above as a first modular projector cage and another modular projector cage as a second modular projector cage; wherein the first and second modular projector cages are arranged in a stacked configuration such that male connectors of the first modular projector cage operably engage female connectors of the second modular projector cage; and wherein retainer pins pass through the female connectors and engage the male connectors to releasably lock the respective rectangular hexahedral open frames of the first and second modular projector cages.

Another aspect of the disclosure is a method of adjusting pitch, roll and yaw of an optical projector housed in a modular projector cage. The method includes: mounting the optical projector onto a mounting plate on a bottom section of the modular projector cage; adjusting the pitch and roll using first and second articulated elevation assemblies operably connected to the mounting plate adjacent a front end of the mounting plate via respective support arms and support brackets; and adjusting the yaw using a yaw assembly operably connected to the mounting plate adjacent a rear end of the mounting plate, wherein adjusting the yaw causes articulated movement of the support arms and support brackets of the first and second articulated elevation assemblies.

Another aspect of the disclosure includes a method of adjusting pitch, roll and yaw of an optical projector housed in a modular projector cage. The method includes mounting the optical projector onto a mounting plate having front and rear ends, wherein the mounting plate is movably connected to a bottom section of the modular projector cage adjacent the front end by articulated mechanical connections each capable of articulated movement and adjacent the rear end by a rotatable mechanical connection capable of rotational movement; adjusting the pitch and roll adjacent the front end of the mount plate; adjusting the yaw adjacent the rear end of the mounting plate; and wherein adjusting the yaw causes rotation of the rotatable mechanical connection and causes articulated movement of the articulated mechanical connections.

BRIEF DESCRIPTION OF THE DRAWINGS

The accompanying drawings, together with the specification, illustrate exemplary embodiments, and, together with the description, serve to explain the principles of these embodiments.

Right-handed Cartesian coordinates shown in some of the Figures are for the sake of reference and for ease of illustration and discussion, and are not intended to be limiting as to orientation or direction. Likewise, directional and orientation-related terms such as "vertical" and "horizontal," "top" and "bottom," "upward" and "downward," "rear" and front," etc. are used by way of reference in the discussion below and in the claims for ease of discussion and are not intended to be limiting as to orientation or direction.

DETAILED DESCRIPTION

Particular embodiments of the disclosure are described below. It will be understood that various modifications may be made and that the scope of the disclosure is not limited to the exemplary embodiments described herein.

The claims as set forth below are incorporated into and constitute a part of this Detailed Description.

In the discussion below, the term "adjacent the front end" of the mounting plate with respect to the articulated elevation assemblies means that the articulated elevation assemblies are attached somewhere between the middle (as defined by the y-center line CL in FIG. 8) and front end of the mounting plate, and in an example respectively reside about midway between the center and front end of the mounting plate on either side of the mounting plate. In an example, the articulated elevation assemblies can be attached to the mounting plate immediately adjacent the front end of the mounting plate. The corresponding interpretation is also used for the term "adjacent the back end" in connection with the description of the yaw assembly and its attachment to the mounting plate.

Modular Projector Cage Configuration

Figure 1:
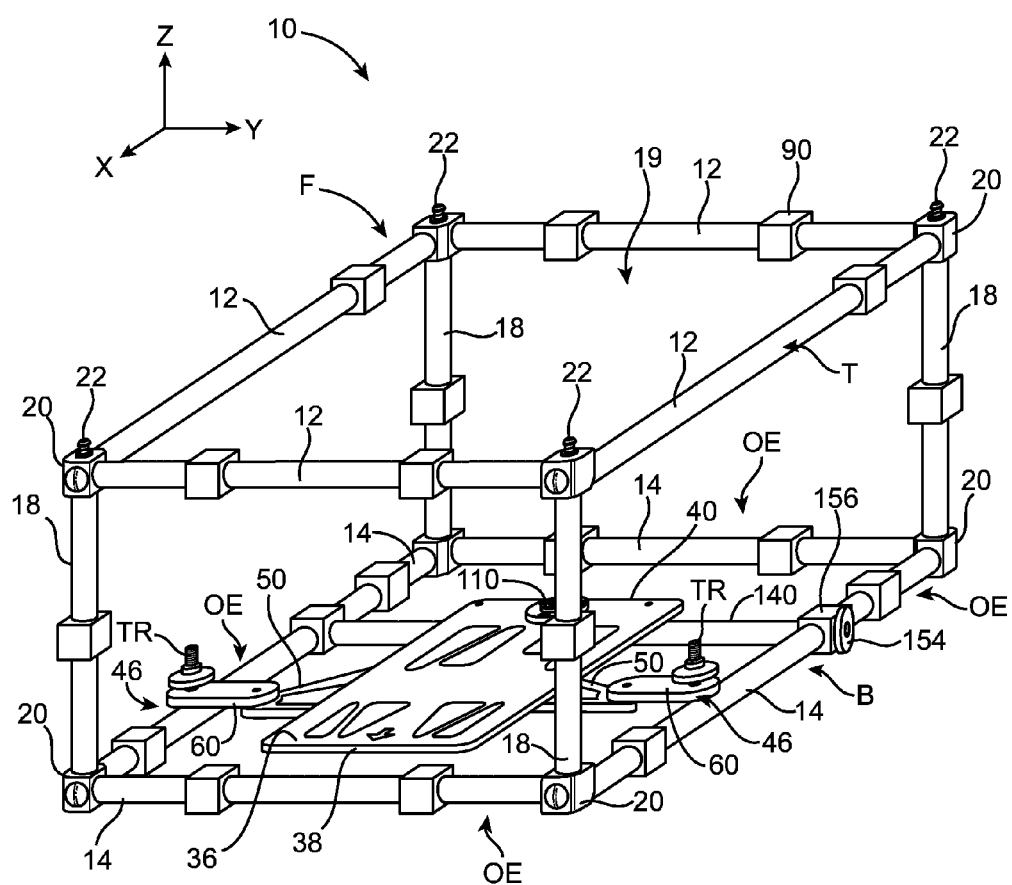
FIG. 1 is an elevated view of an example of the modulator projector cage according to the disclosure.
Figure 2:
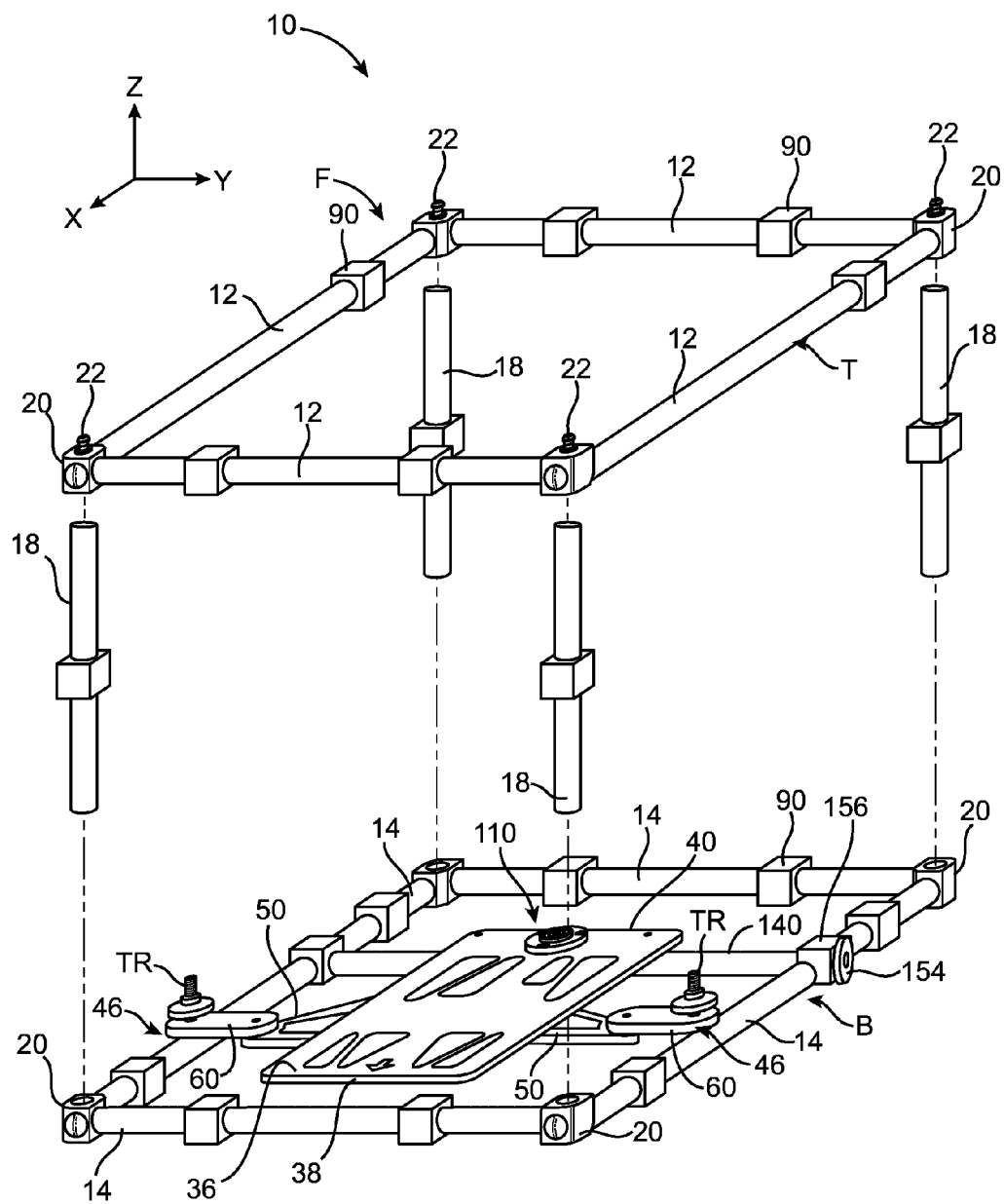
FIG. 2 is similar to FIG. 1 but is a partially exploded view showing how the vertical support bars removably engage with corresponding top and bottom corner fittings so that the modular cage can be disassembled, thereby allowing the top and bottom sections and the support bars to be stored in a relatively flat storage container.
Figure 3:
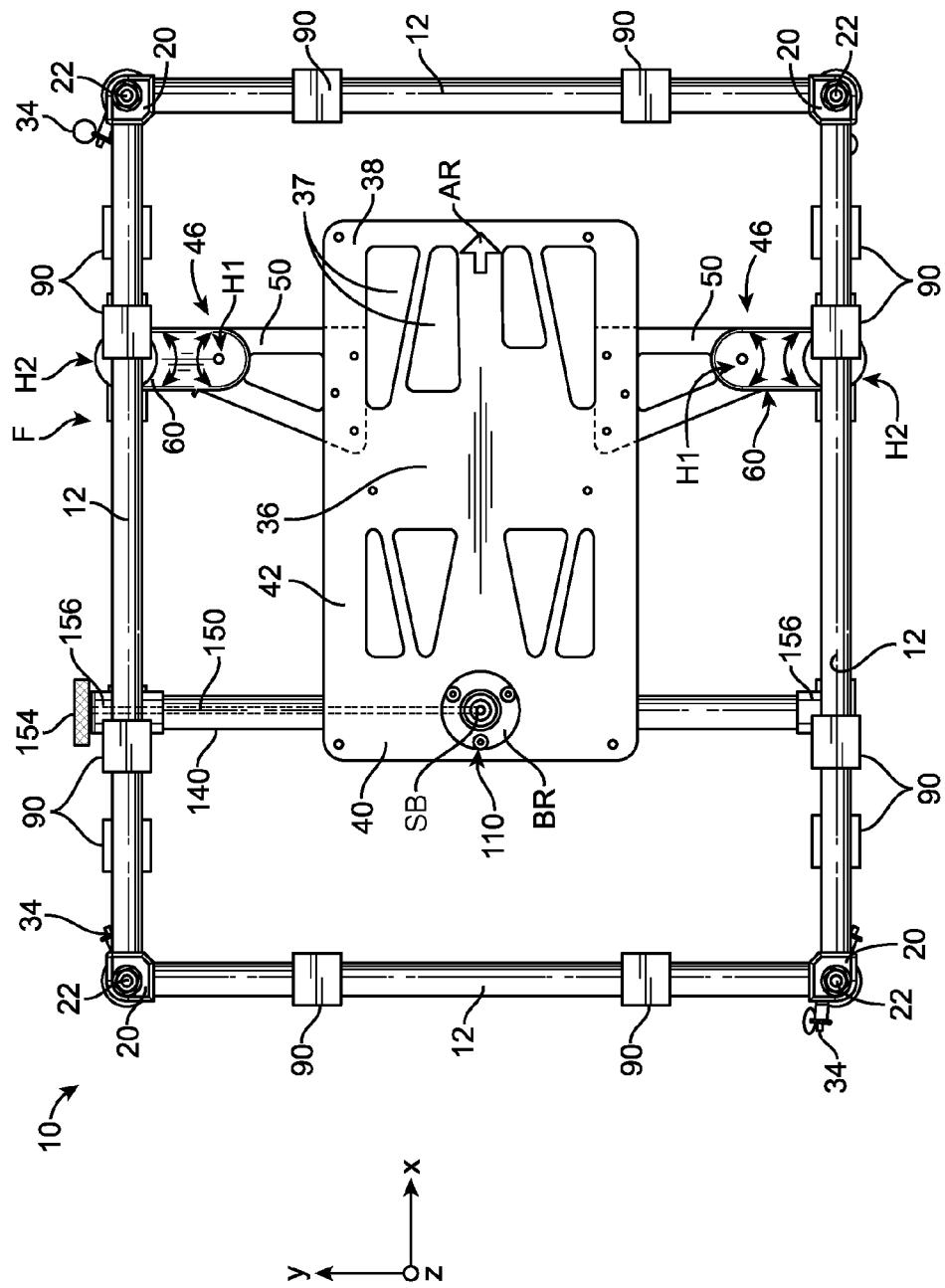
FIG. 3 is a top-down (−z direction) view of an example modular projector cage in accordance with one embodiment of the disclosure.
Figure 4:
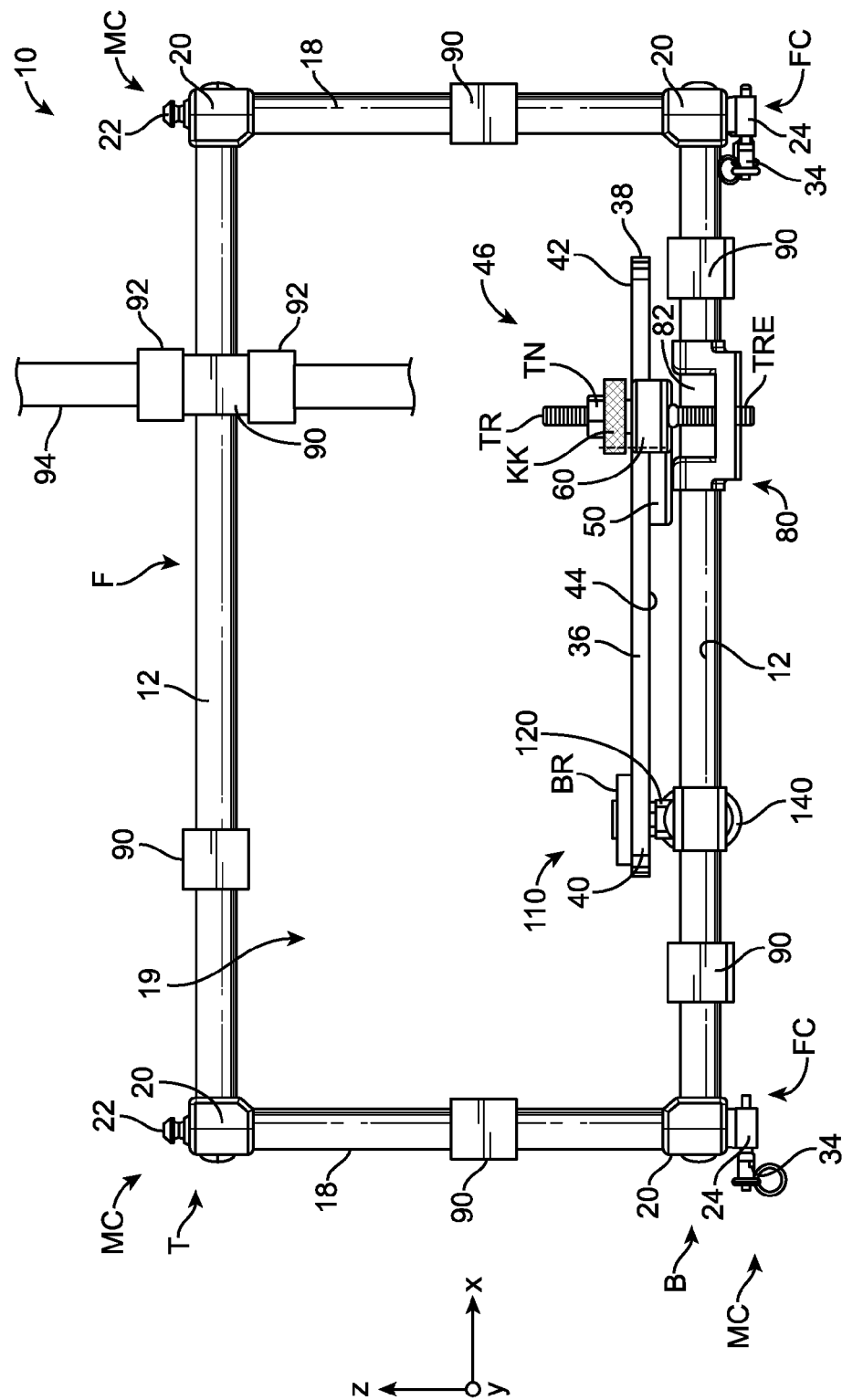
FIG. 4 is a side view of the modular projector cage shown in FIG. 1 as viewed looking in the +y direction.
Figure 5:
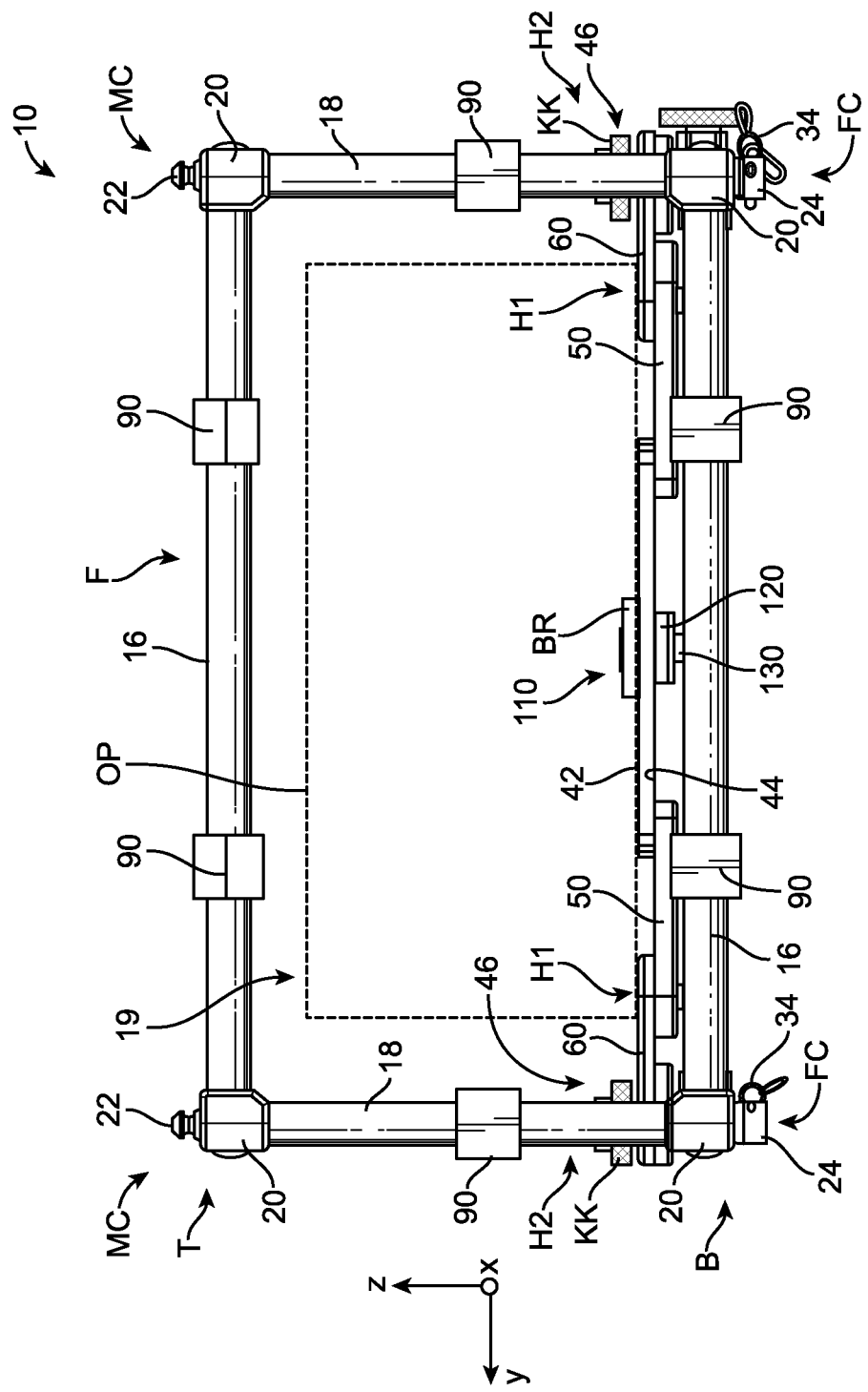
FIG. 5 is a rear-end view of the modular projector cage shown in FIG. 1 as viewed looking in the +x direction.

FIG. 1 is an elevated view of an example embodiment of modular projector cage 10 according to the disclosure, while FIG. 2 is an elevated, partially exploded view of the modular projector cage. The partially exploded view of FIG. 2 shows an example of how the modular projector cage 10 can be taken apart and stored in a relatively flat configuration, e.g., for shipping in a relatively flat storage container (not shown). FIGS. 3 through 5 are top-down, side and front-on views, respectively, of an example modular projector cage 10 according to the disclosure.

With references to FIGS. 1 through 5, in one aspect, modular projector cage 10 comprises a hexahedron having a rectangular top section ("top") T and a rectangular bottom section ("bottom") B. The top T is formed by four top bars 12 joined by four top corner fittings 20, denoted 20T. The bottom B is formed in the same manner but with bottom bars 14, wherein the four bottom corner fittings 20 are denoted 20B. In the examples discussed below, top corner fittings 20T include male connectors MC, while bottom corner fittings 20B include female connectors FC. In other examples, top corner fittings 20T can include female connectors FC and the bottom corner fittings 20B can include male connectors MC. Each corner fitting 20 has a body portion 21.

The top T and bottom B are spaced apart by four support bars 18, with the ends of each support bar respectively removably connected to one top corner fitting 20T and one bottom corner fitting 20B. In an example, the top T, bottom B and support bars 18 define a rectangular open hexahedral frame ("frame") F. In frame F, top T and bottom B lie in parallel horizontal (x-y) planes while support bars 18 are parallel and oriented vertically (i.e., in the z-direction). The frame F has a total of eight corner fittings 20 (four top corner fittings 20T and four bottom corner fittings 20B) and defines an open volume 19 sized to accommodate at least one optical projector OP, which is shown in a dashed outline in FIG. 5. Frame F has an outer edge or perimeter OE.

The bars 12, 14, and 18 can have any suitable cross section and, in some aspects, are hollow with a circular cross section. The bars 12, 14 and 18 can be made of any suitable material. Representative materials include, without limitation, metals, such as stainless steel; engineering plastics; polymers; fiberglass; Tegris®; and carbon-fiber materials.

The frame F of modular projector cage 10 can have any suitable dimensions, which can be readily determined by one skilled in the art based on the dimensions of optical projector (or projectors) OP to be adjustably supported and protected therein. In some aspects, frame F has a width of from about 24 inches to about 36 inches, a length of from about 30 inches to about 42 inches and a height of from about 10 inches to about 22 inches. In some aspects, frame F has a width of from about 28 inches to about 32 inches, a length of from about 34 inches to about 38 inches and a height of from about 14 inches to about 18 inches.

As illustrated in FIG. 2, modular projector cage 10 can be rapidly assembled and disassembled by connecting or disconnecting support bars 18 from their corresponding top and bottom corner fittings 20T and 20B. This allows modular projector cage 10 to be disassembled and stored in a relatively flat configuration by laying top T and bottom B on one another inside a relatively flat shipping container, along with the removable support bars 18. This reduced shipping volume saves shipping costs when moving the projector cage from to and from a venue where optical projectors OP are to be used.

In an example embodiment, frame F includes adjustable grips 90 provided on one or more of top bars 12, bottom bars 14 and support bars 18. The grips 90, which may be made of any suitable material, including elastomeric plastics, facilitate the mounting of modular projector cage 10 by clamps 92 on an external rigging 94 (see FIG. 4).

Corner Fittings

Figure 6A:
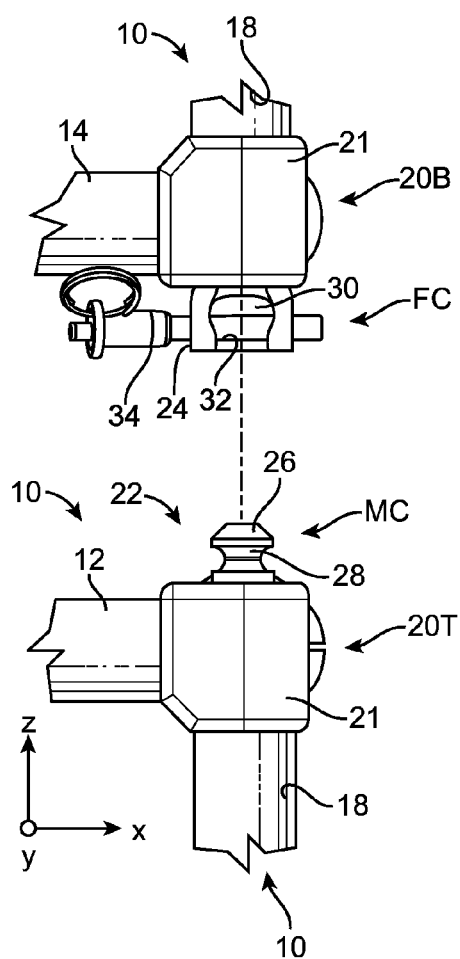
FIG. 6A is a close-up side view of top (male) and bottom (female) corner fittings of adjacent modular projector cages.
Figure 6B:
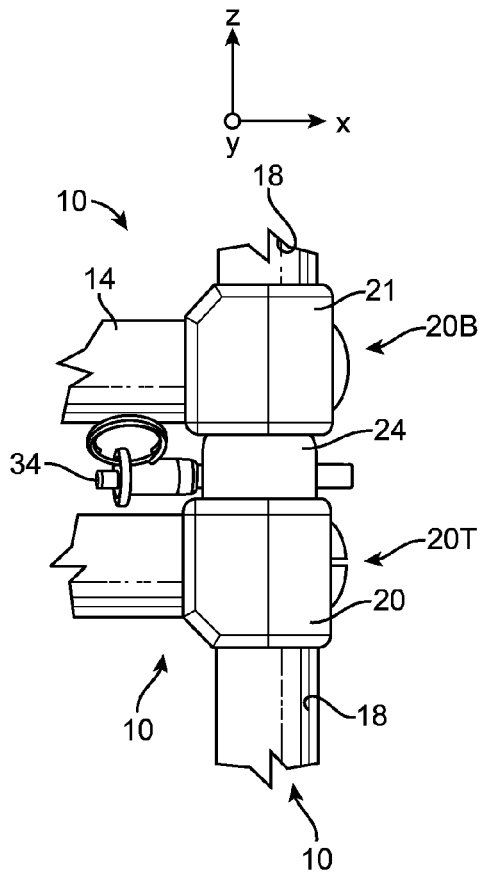
FIG. 6B is similar to FIG. 6A, but shows the two adjacent modular projector cages operably connected at the respective male and female corner fittings using a retainer pin to define a locked male-female connector pair.

As noted above, the bars 12, 14 and 18 that form frame F are secured using the aforementioned corner fittings 20. FIG. 6A is a close-up side view of a top corner fitting 20T and a bottom corner fitting 20B of adjacent frames F of two modular projector cages 10. FIG. 6B is similar to FIG. 6A but shows modular projector cages 10 operably connected at top and bottom corner fittings 20T and 20B such that the operably connected male connector MC and female connector FC of FIG. 6A form a male-female connector pair.

In an example embodiment, each male connector MC is defined by a protrusion 22 that extends in the direction away from support bars 18, i.e., in the vertical or z-direction. In an example, protrusion 22 is in the form of a knob, and in the discussion below is referred to as knob 22. In one example, knob 22 has a tapered end 26 and a retaining feature 28 in the form of a groove around its central portion. In another example, retaining feature 28 is in the form of a central, lateral bore formed in knob 22 (e.g., the bore runs in the x-direction or the y-direction.

Further in the example embodiment, female connectors FC each include a receptacle 24 having a cavity 30 configured to receive and matingly engage knob 22 of male connector MC of another modulator projector cage 10. In FIG. 6A, receptacle 24 is shown in a partial cut-way view. In an example embodiment, receptacle 24 includes a transverse (e.g., x-direction or y-direction) retainer pin bore 32 that is aligned with retaining feature 28 of knob 22 when two modular projector cages 10 are operably connected, as shown in FIG. 6B. A retainer pin 34 extends the length of retainer pin bore 32. When retainer pin 34 is removed, knob 22 of top corner fitting 20T can be inserted into and removed from cavity 30 of bottom corner fitting 20B of the adjacent modular projector cage 10. When retainer pin 34 is in place and engaged with retaining feature 28, knob 22 is releasably retained (locked) within cavity 30, thereby locking the adjacent frames F together. In an example, retainer pin 34 has a spring-based locking mechanism to facilitate rapid insertion and removal of the retainer pin from retainer pin bore 32 while also releasably locking the retainer pin in place within the retainer pin bore.

Stacked Frame

A feature of modular projector cage 10 is that multiple cages can be operably connected and locked together in a stacked configuration. Moreover, the locking connections can be made quickly as described above so that multiple modular cages 10 can be rapidly deployed in a stacked manner to form a stacked frame, and the stacked frame can then be quickly disassembled, as discussed in greater detail below.

Figure 7B:
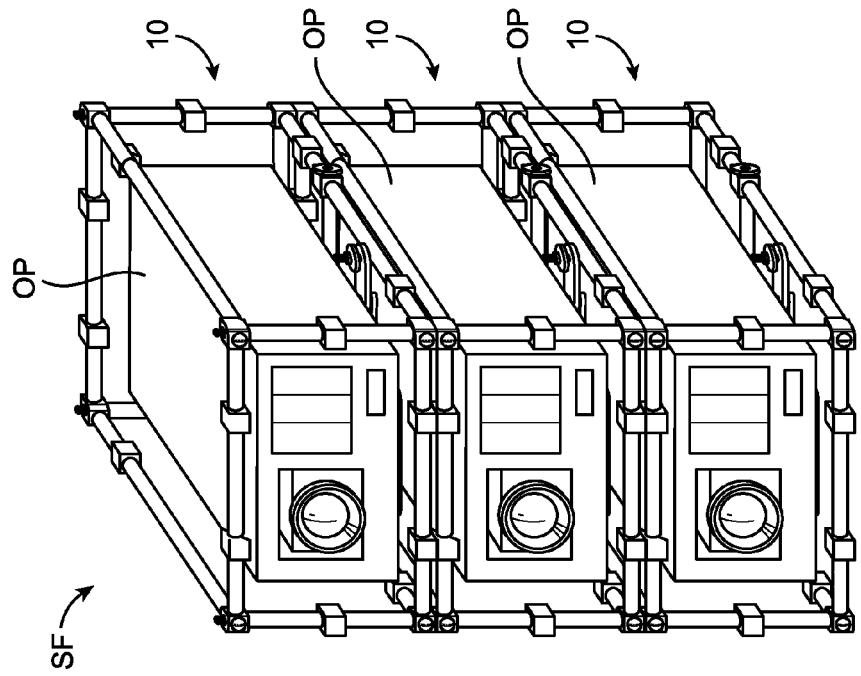
FIG. 7B is the same as FIG. 7B, but with each modular projector cage adjustably supporting an optical projector.
Figure 7A:
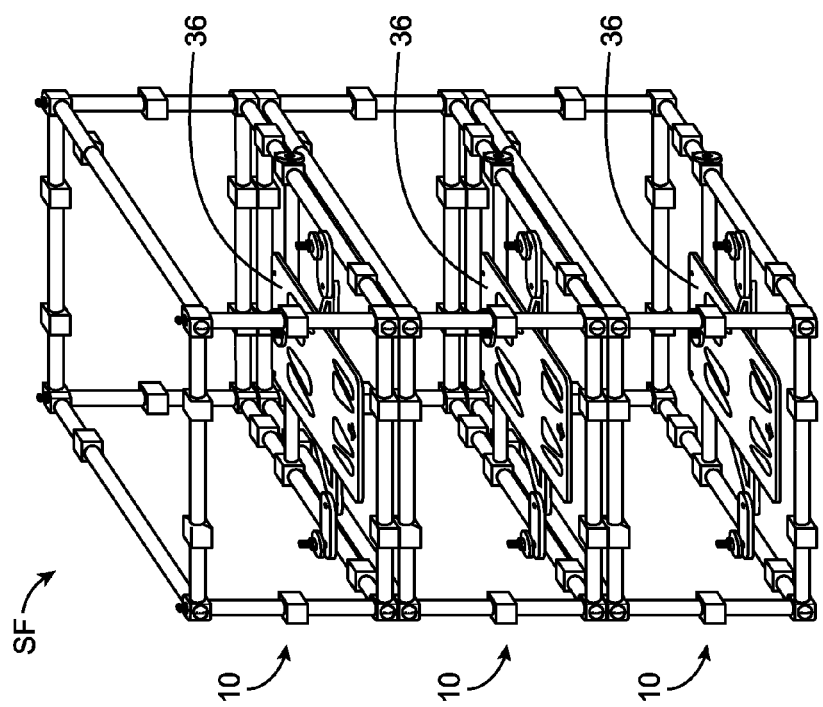
FIG. 7A is a front elevated view of an example stacked frame formed from three operably connected modular projection cages.

FIG. 7A is a front elevated view of an example stacked frame assembly ("stacked frame") SF formed from three operably connected modular projection cages 10. FIG. 7B is the same as FIG. 7B, but with each modular projector cage 10 in stacked frame SF adjustably supporting an optical projector OP so that the orientation (i.e., the pitch, roll and yaw) of each optical projector can be adjusted so that the optical projectors point in a desired direction or directions (e.g., their respective beams are directed at a particular section or sections of a distant screen, not shown).

The retainer pin 34, the retainer pin bore 32 and the retaining feature 28 of knob 22 define a quick-locking mechanism that can be used to quickly lock and unlock stacked modular projector cages 10 of stacked frame SF. Such a locking mechanism provides structural integrity to the stacked frame SF. This is a useful feature when stacked modular projector cages 10 are used outside, where they can be subjected to the elements, such as wind, and put under stress and/or strain. It is also noted that modular projector cage 10 also serves as a protective exoskeleton for optical projector OP.

An advantage of the configuration of top and bottom corner fittings 20T and 20B as explained above in connection with FIGS. 6A and 6B is that when two modular projector cages 10 are operably connected to form stacked frame SF, an observer sees only the corner fittings 20 and none of the internal connection features (e.g., knobs 22, cavity 30, etc.) except for perhaps a small portion of retainer pin 34. Furthermore, the internal connecting features are protected from the elements by body 21 of corner fittings 20, which is particularly important when modular projector cage 10 is used outside.

Projector Mounting Plate

Figure 8:
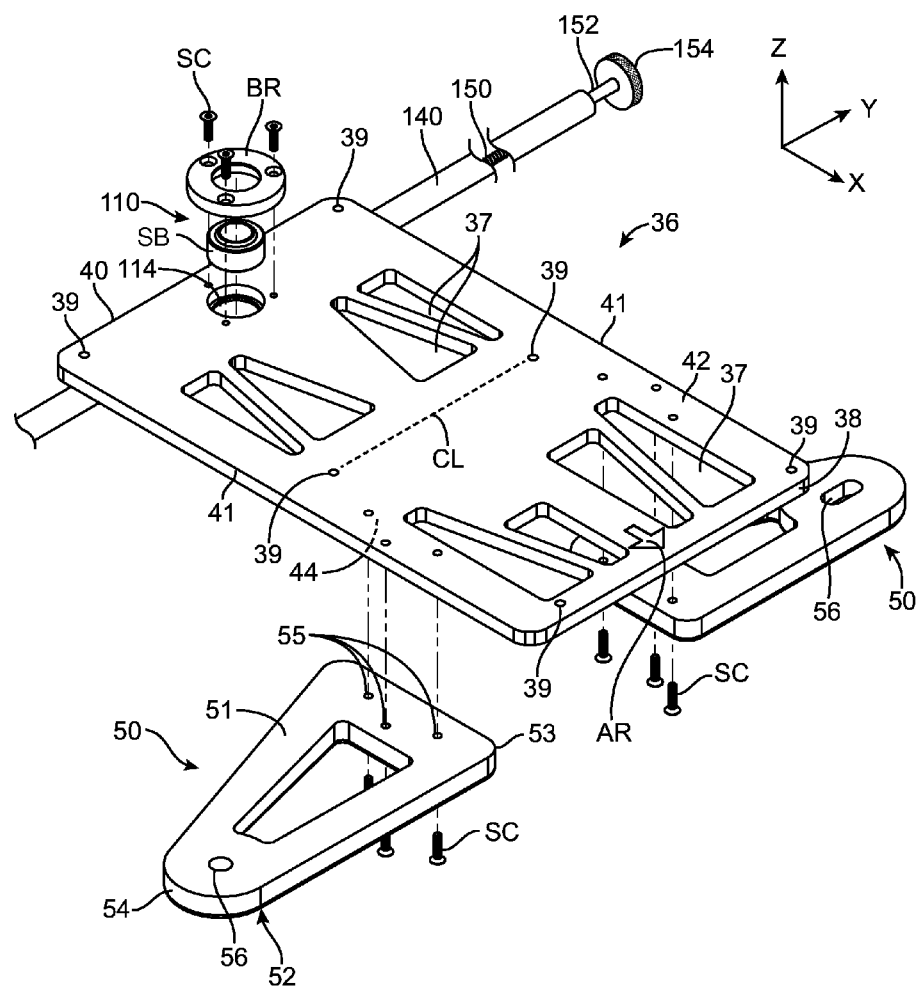
FIG. 8 is an elevated view of an example mounting plate and also showing the support arms of the two articulated elevation assemblies that are mechanically connected to the mounting plate adjacent the mounting plate front end, and also showing some of the components of the yaw assembly, which is mechanically connected to the mounting plate adjacent the mounting plate rear end.

The modular projector cage 10 can be configured for use with a wide variety of different models or types of optical projectors OP. With reference again to FIGS. 1 through 5, in one aspect of the disclosure, modular projector cage 10 includes a projector mounting plate ("mounting plate") 36. FIG. 8 is a close-up elevated view of an example mounting plate 36. Mounting plate 36 has a front end 38, a rear end 40, opposite sides 41, and top and bottom planar surfaces 42 and 44, respectively. A centerline CL runs in the y-direction represents the middle of the plate in the x-direction between the front and rear ends 38 and 40.

The mounting plate 36 is configured to operably support a particular model or a number of different models of optical projector OP as described below. In an example, mounting plate 36 can include large apertures or holes 37 that serve to reduce weight. In an example, mounting plate 36 also includes a number of clearance holes 39 that align with threaded holes of optical projector OP (not shown) to secure the optical projector to the mounting plate with threaded screws. Other means for mounting optical projector OP to mounting plate 36 can also be employed.

Mounting plate 36 is operably connected to bottom B of frame F so that it is movable (adjustable) with respect to the x, y and z axes. An arrow AR on mounting plate 36 at front end 38 shows an example direction in which optical projector OP points and thus the direction in which it projects its image. The mounting plate 36 is thus configured as described below to adjust the roll, pitch and yaw of optical projector OP, with the roll and pitch adjustments made adjacent the front end 38 of the mounting plate and the yaw adjustment being adjacent the rear end 40 of the mounting plate as described below.

Articulated Elevation Assemblies

In one aspect, mounting plate 36 is mechanically connected to the bottom B of modular projector cage 10 by two independently operably articulated elevation assemblies 46 each capable of articulated movement. The articulated elevation assemblies 46 are mechanically connected to mounting plate 36 adjacent front end 38, e.g., forward of centerline CL, and in an example about midway between the centerline and the front end 38 adjacent respective sides 41. The articulated elevation assemblies 46 are used to control (adjust) the amount of pitch and roll of mounting plate 36 as described below.

Figure 9:
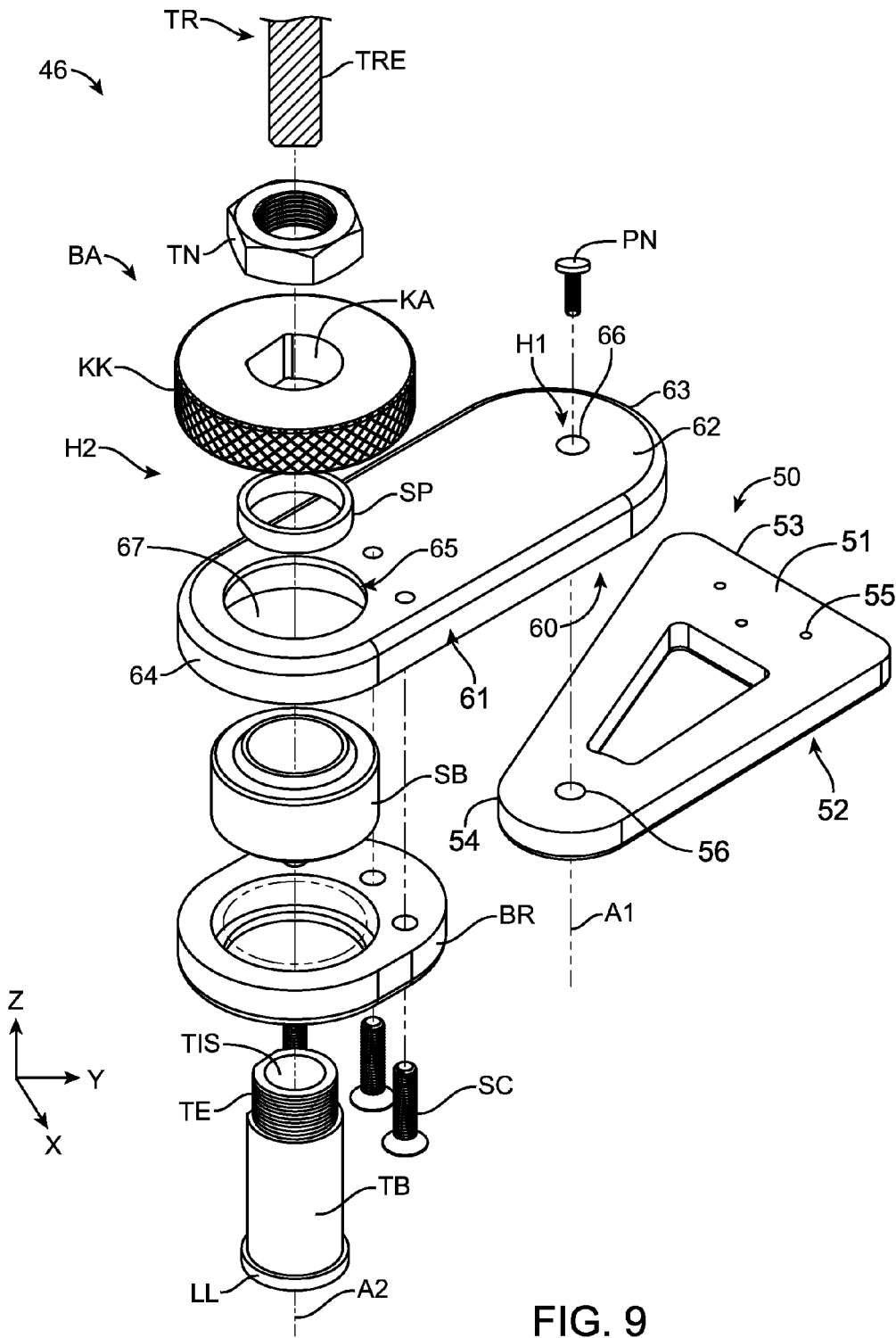
FIG. 9 is an elevated exploded view of an example articulated elevation assembly that defines two hinges for articulated movement to accommodate yaw adjustment performed by the yaw assembly.

FIG. 9 is an elevated exploded view of an example articulated elevation assembly 46. Each articulated elevation assembly 46 includes a support arm 50 with top and bottom surfaces 51 and 52 and proximal and distal ends 53 and 54. The proximal end 53 of support arm 50 includes bores 55 while the distal end includes a bore 56. At least one of the bores 56 of support arms 50 may be elongate (as shown in FIG. 8) to accommodate the articulated movement of the support arm 50 to prevent binding.

As best seen in FIG. 8, the proximal end 53 of each support arm 50 is attached to bottom planar surface 44 of mounting plate 36 adjacent respective sides 41 via screws SC that pass through bores 55.

Articulated elevation assembly 46 also includes a support bracket 60 that is rotatably connected to the distal end 54 of the corresponding support arm 50. Support bracket 60 includes a lower surface 61, and upper surface 62, and proximal and distal ends 63 and 64. The support bracket 60 includes an aperture 65 at distal end 64 and also includes a smaller bore 66 at proximal end 63, wherein the small bore 66 is aligned in the z-direction with bore 56 of support arm 50. A pin PN passes through bores 56 and 66 to rotatably attach arm 50 to the lower surface 61 of the support bracket 60, thereby defining a first hinge H1 that allows for rotation of the support arm and the support bracket about an axis A1 that runs in the z-direction. Support bracket 60 also includes a recess 67 in lower surface 61 centered on aperture 65.

Articulated elevation assembly 46 also includes a bushing assembly BA that rotatably engages support bracket 60 at bore 65 to define a second hinge H2 that allows the support bracket 60 to rotate around an axis A2 that is parallel to axis A1. First and second hinges H1 and H2 allow for articulated movement of support bracket 60 and support arm 50 for each of the articulated elevation assemblies 46. The articulated configuration of support bracket 60 and support arm 50 define an articulated mechanical connection between mounting plate 36 and bottom B of frame F.

In an example, bushing assembly BA includes, in order from bottom to top in the +z direction: a threaded bushing TB, a bearing retainer BR, a spherical bearing SB, a spacer SP, a knurled knob KK with a keyed aperture KA, a threaded nut TN, and a threaded rod TR having an end portion TRE. Bearing retainer BR is configured to retain spherical bearing SB. Screws SC are used to secure bearing retainer BR and spherical bearing SB within recess 67 of support plate 60. Spacer SP fits within aperture 65 and is used to provide space between spherical bearing SB and knurled knob KK to prevent binding.

Threaded bushing TB includes a threaded end TE, a threaded inner surface TIS, and a lower lip LL. Threaded bushing TB runs through the bearing retainer BR, spherical bearing SB, spacer SP and aperture 65 and knurled knob KK. The threaded end TE includes a flat portion that operably engages with keyed aperture KA of knurled knob KK. Threaded nut TN threadedly engages the threaded end TE of threaded bushing TB while threaded rod TR threadedly engages threaded nut TN as well as the threaded inner surface TIS of the threaded bushing. The spherical bearing SB allows for the aforementioned rotation of support plate 60 about axis A2. The lower lip LL of threaded bearing resides adjacent the bottom surface of bearing retainer BR.

Figure 10:
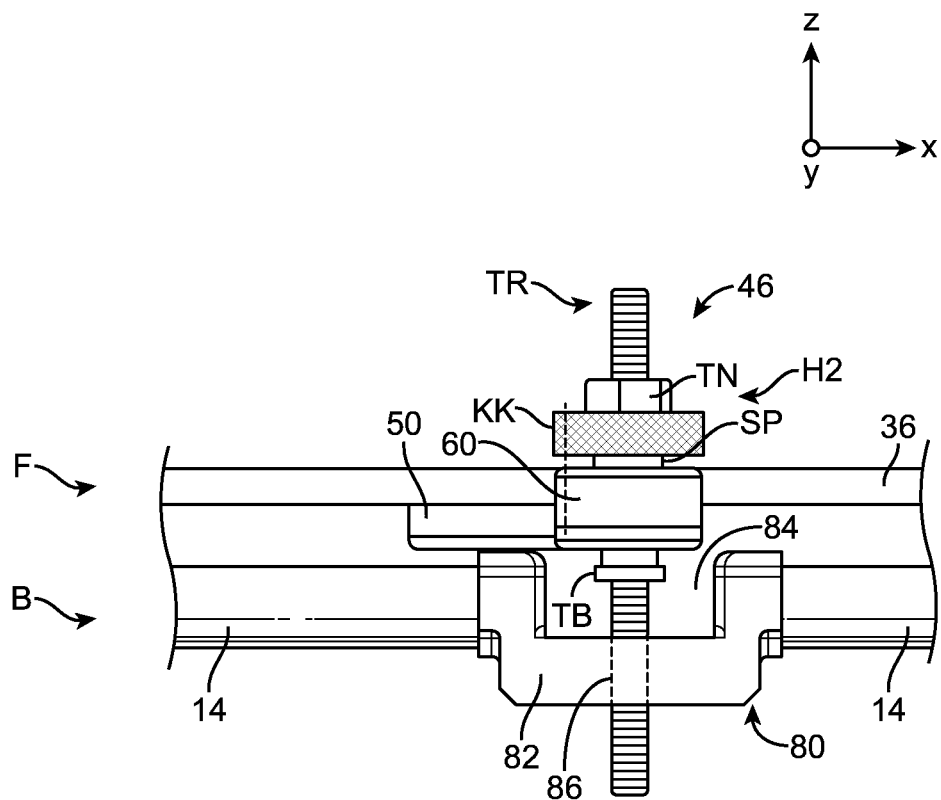
FIG. 10 is a close-up side view of the example articulated elevation assembly of FIG. 9, showing the recessed bracket that receives the threaded rod and that can accommodate downward movement of the articulated elevation assembly, and showing how the threaded rod is located at the outside edge of the frame of the modular cage for easy access.

FIG. 10 is a close-up side view of articulated elevation assembly 46 as operably arranged relative to the bottom B of frame F. Bottom B of frame F includes two recess brackets 80 that respectively fit within the two bottom bars 14 that run in the x-direction. Recess bracket 80 includes a lower wall 82 that defines a recess 84. Lower wall 82 includes a threaded bore 86 configured to threadedly receive the end portion TRE of threaded rod TR. Thus, the two recess brackets 80 and the threaded bores 86 therein serves to respectively secure the articulated elevation assemblies 46 to the bottom B of frame F via the corresponding threaded rods TR of the two articulated elevation assemblies.

The rotation of knurled knob KK acts to elevate or de-elevate support bracket 60, which in turn acts to elevate or de-elevate the front end 38 of the mounting plate 36 at the corresponding side 41. Because the two articulated elevation assemblies 46 can be adjusted independently by means of their threaded rods TR and knurled knobs KK, the elevation (pitch) as well as the roll of the front end 38 of mounting plate 36 can be adjusted via operation of one or both of knurled knobs KK. Recess 84 is sized so that articulated elevation assembly 46 can move in the −z direction and into the recess in order to accommodate low elevations of mounting plate 36, including elevations where the front end 38 is tilted downward relative to the horizontal plane.

The articulated elevation assemblies 46 define respective articulated mechanical connections between the bottom B of frame F and the mounting plate 36 adjacent the mounting plate front end 38. The articulated mechanical connections by definition are capable of articulated movement by virtue of hinges H1 and H2 in each of the articulated elevation assemblies 46. These articulated movements are needed to accommodate yaw adjustment of mounting plate 36 adjacent rear end 40, as is now explained below.

Yaw Assembly

Figure 11:
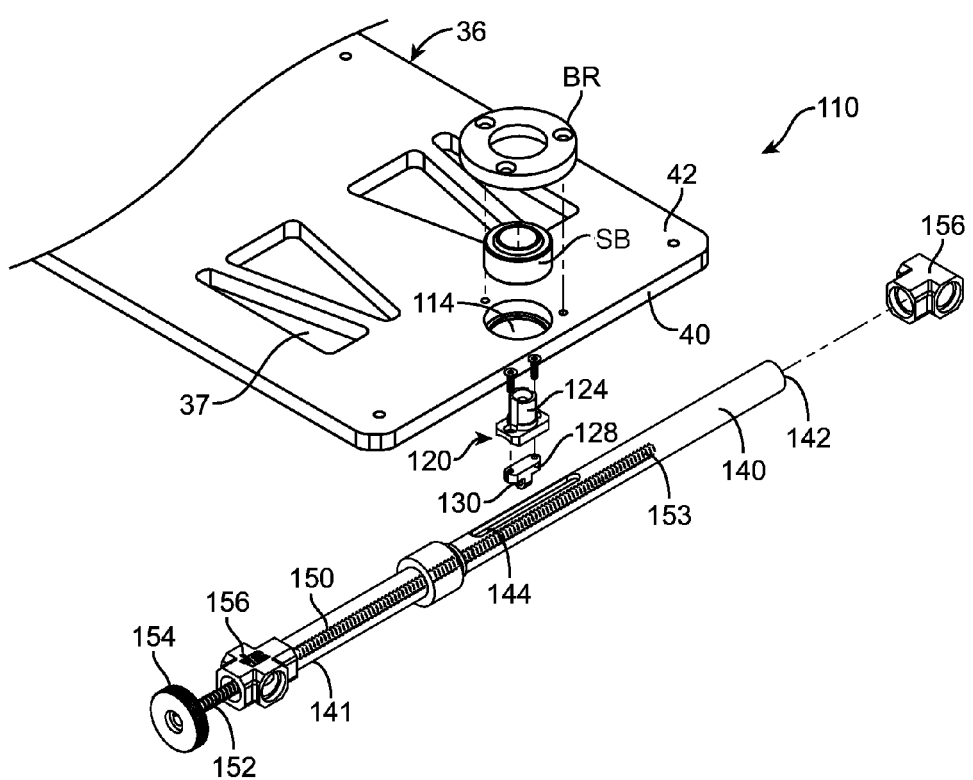
FIG. 11 is an elevated and partially exploded view of an example yaw assembly that is rotatably connected to the mounting plate adjacent the mounting plate rear end and configured to adjust the yaw of the mounting plate by turning a threaded rod using a knob located at an outside edge of the frame of the modular cage for easy access.
Figure 12:
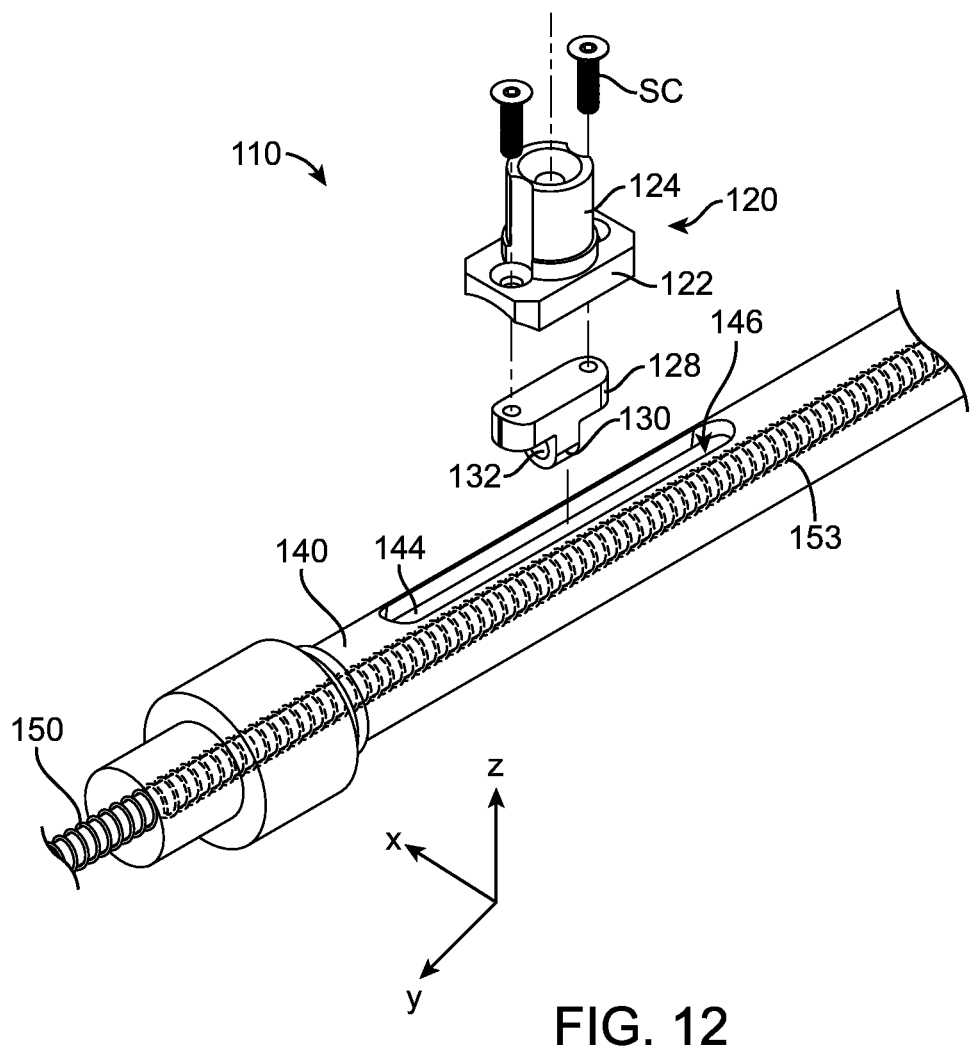
FIG. 12 is a close-up elevated and partially exploded view of a yaw assembly showing the slotted cross-tube, the threaded rod supported therein, and the mounting fitting that movable engages the threaded rod and that is attached to the mounting plate to allow for lateral movement of the mounting plate adjacent the rear end of the mounting plate to adjust the yaw of the mounting plate.

In an example, a yaw assembly 110 is rotationally attached to mounting plate 36 adjacent the rear end 40 of mounting plate 36. FIG. 11 is an exploded view of yaw assembly 110, portions of which can also be seen in FIGS. 4 and 8. FIG. 12 is a close-up view of a portion of yaw assembly 110.

The mounting plate 36 includes, adjacent rear end 40, an open recess 114 that accommodates a spherical bearing SB.

The spherical bearing SB is held in recess 114 by a bearing retainer BR that is secured to the mounting plate 36 with screws SC.

Yaw assembly 110 includes a mounting fitting 120 that has a base 122 configured to fit over an upper portion of a cross-tube 140 that has proximal and distal ends 141 and 142, and a slot 144 in the upper portion of the cross-tube generally midway between the proximal and distal ends. The cross-tube 140 runs in the y-direction between opposite bottom tubes 14 and runs underneath mounting plate 36 at recess 114 so that the slot 144 resides beneath the recess.

The mounting fitting 120 also includes a stem 124 that extends upwardly from base 122 into spherical bearing SB. The stem 124 can rotate within the spherical bearing SB. Mounting fitting 120 also includes a tongue member 128 that is attached to or that is integrally formed with base 112. Tongue member 128 includes a threaded portion (tongue) 130 that extends in the −z direction and that includes a threaded aperture 132 that runs in the y-direction. Thus, in an example, tongue 130 and threaded aperture 132 define a threaded pad eye. Tongue 130 is sized to fit through slot 144, which leads into an interior 146 of the cross-tube. Thus, stem 124 and tongue 130 extend in opposite directions. In an example, some or all of mounting fitting 120 is made of a thermoplastic material such as DELRIN®.

The threaded aperture 132 of tongue 130 is configured to threadedly engage a distal end 153 of a threaded rod 150 that runs through at least a portion of the cross-tube interior 146 to pass under slot 144. The threaded rod 150 also runs through a joining fixture 156 that joins bottom tube 14 and the proximal end 141 of cross-tube 140. A second joining fixture 156 at the opposite bottom tube 14 is used to secure the distal end 142 of cross-tube 40. The threaded rod 150 includes a proximal end 152 at which is attached a knob 154 that can be used to manually turn the threaded rod.

In the operation of yaw assembly 110, a user manually turns threaded rod 150 by turning knob 154. Because threaded rod TR threaded engages threaded tongue 130, turning the threaded rod serves to push or pull mounting fitting 120 (depending on the direction of rotation), which in turn causes a lateral displacement (i.e., a y-displacement) of the rear end 140 of mounting plate 36. This lateral displacement is accommodated by stem 124 rotating within spherical bearing SB. The lateral displacement of the rear end 140 of mounting plate 36 defines an amount of yaw for the mounting plate and thus for the optical projector OP mounted thereon. In an example, the yaw adjustment causes mounting plate 36 to pivot where the center of the optical projector OP resides.

Yaw assembly 110 defines a rotatable mechanical connection between the bottom B of frame F and mounting plate 36 adjacent the mounting plate rear end 40 that allows for adjusting the yaw of the mounting plate adjacent the rear end of the mounting plate.

The yaw adjustment of mounting plate 36 provided by yaw assembly 110 is enabled by the articulated elevation assemblies 46 that reside adjacent the front end 38 of mounting plate 36 at respective sides 41 of the mounting plate. When the yaw is adjusted by laterally displacing the rear end 40 of mounting plate 36, the first and second hinges H1 and H2 of each articulated elevation assembly 46 provide articulated movements that accommodate the lateral movement (i.e., a rotation about the z-axis) of the mounting plate. Without the articulated movements provide by the pairs of hinges H1 and H2 of each of the articulated elevation assemblies 46, the mounting plate 36 could not effectively rotate about the z-axis, thereby preventing yaw adjustment.

In an example, the articulated elevation assemblies 46 and the yaw assembly 110 have sufficient friction such that the position of mounting plate 36 remains substantially fixed in its set orientation (e.g., select or set amounts of pitch, roll and yaw) even when the optical projector OP is mounted thereon. In fact, in most instances, the adjustment of the pitch, roll and yaw of mounting plate 36 is performed when optical projector OP is mounted on the mounting plate. In an example, the use of threaded rods TR and 150 provides the needed friction to maintain the mounting plate 36 and optical projector OP in the set orientation without having to mechanically lock the mounting plate in place using additional locking or securing means.

An advantage of the configurations of the articulated elevations assemblies 46 and the yaw assembly 110 is that each can be adjusted when optical projector OP is mounted on the mounting plate 36. In particular, knobs KK used for pitch and roll adjustment are located at opposite outer edges OE of frame F at bars 14 of bottom B and so are easily accessed when the optical projector OP is present. Likewise, knob 154 of yaw assembly 110 resides at the outer edge OE of frame F next to one of bars 14, i.e., away from optical projector OP. Thus, a user of projector module cage 10 can easily adjust pitch, roll and yaw at the perimeter or outer edge OE of Frame F rather than having to reach into open volume 19 of the frame. Said differently, optical projector OP does not obstruct access to the knobs KK and 154 used for adjusting the orientation of mounting plate 136. In an example, mounting plate 36 is configured so that the adjustments to the optical projector OP when mounted thereon occur relative to the centerline or the optical axis of the optical projector.

Methods of Adjusting the Pitch, Roll and Yaw of the Optical Projector

Aspects of the disclosure are directed to methods of adjusting the pitch, roll and yaw of optical projector OP supported in a modular projector cage 10. An example method includes: mounting the optical projector OP onto mounting plate 36 on bottom B of frame F of the modular projector cage 10; adjusting the pitch and roll using first and second articulated elevation assemblies 46 operably connected to the mounting plate 36 adjacent the front end 38 via respective support arms 50 and support brackets 60; and adjusting the yaw using yaw assembly 110 adjacent rear end 40 of mounting plate 36, wherein adjusting the yaw causes articulated movement of the support arms 50 and support brackets 60 of the first and second articulated elevation assemblies.

Another example method includes: mounting the optical projector OP onto mounting plate 36, wherein the mounting plate is movably connected to bottom B of the modular projector cage adjacent the front end 38 by articulated mechanical connections each capable of articulated movement, and adjacent the rear end 40 by a rotatable mechanical connection capable of rotational movement; adjusting the pitch and roll adjacent the front end 38 of the mounting plate 36; adjusting the yaw adjacent the rear end 40 of the mounting plate; and wherein adjusting the yaw causes rotation of the rotatable mechanical connection and also causes articulated movement of the articulated mechanical connections.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A modular projector cage for operably supporting an optical projector, comprising:
   a rectangular hexahedral open frame having a bottom horizontal section;
   a mounting plate operably disposed on the bottom horizontal section and configured to adjustably support the optical projector, the mounting plate having first and second opposite sides and front and rear ends;
   first and second articulated elevation assemblies respectively operably connected to the mounting plate at the first and second opposite sides via respective first and second articulated mechanical connections each capable of articulated movement, the first and second articulated elevation assemblies being independently operable to adjust a pitch and a roll of the mounting plate; and
   a yaw assembly operably connected to the mounting plate to provide a yaw adjustment, wherein the yaw adjustment causes the articulated movement of the first and second articulated mechanical connections;
   wherein at least one of the first and second articulated elevation assemblies include a support arm and a support bracket, the support arm extending from the mounting plate and rotatably coupled to the support bracket, thereby defining a first hinge that allows for rotation of the support arm and the support bracket about a first axis, wherein the support bracket is rotatably coupled to the bottom horizontal section thereby defining a second hinge that allows the support bracket to rotate around a second axis that is offset from and parallel to the first axis.

2. The modular projector cage of claim 1, wherein the first and second articulated elevation assemblies and the yaw assembly are each configured to maintain the mounting plate in a select orientation via frictional resistive forces when the optical projector is mounted on the mounting plate.

3. The modular projector cage of claim 1, wherein the first and second articulated elevation assemblies respectively include first and second bearing assemblies that respectively include first and second threaded rods that threadedly connect to respective first and second recess brackets of the bottom horizontal section, wherein rotation of one or both of the first and second threaded rods causes a change in elevation of the front end of the mounting plate.

4. The modular projector cage of claim 1, wherein the mounting plate includes an open recess adjacent the rear end of the mounting plate, and wherein the yaw assembly includes:
   a cross-tube having an interior, proximal and distal ends and a slot generally midway between the proximal and distal ends;
   a threaded rod that runs through the interior of the cross-tube to beneath the slot;
   a knob connected to an end of the threaded rod so that rotation of the knob causes rotation of the threaded rod;
   a mounting fixture that includes a tongue that extends into the slot and that includes a threaded aperture that threadedly engages the threaded rod, and that includes a stem that extends in a direction opposite the tongue;
   a spherical bearing that resides within the open recess and that receives the stem so that the stem can rotate therein;
   a bearing retainer that retains the spherical bearing to the mounting plate; and
   wherein the rotation of the threaded rod causes the yaw adjustment.

5. The modular projector cage of claim 1, further comprising the optical projector mounted on the mounting plate.

6. The modulator projector cage of claim 1, wherein the bottom section is formed by bottom tubes connected by bottom corner fittings, and wherein the rectangular hexahedral open frame further includes:
   a top section formed by top tubes connected with top corner fittings; and
   support tubes that space apart the top and bottom sections, wherein the support tubes each removably engage opposing ones of the top and bottom corner fittings.

7. The modular projector cage of claim 1, wherein the mounting plate has a centerline and the yaw assembly includes a third axis, further wherein the first and second axes are located between the centerline and the front end of the mounting plate, and the third axis is located between the centerline and the rear end of the mounting plate.

8. The modular projector cage of claim 1, wherein the support arm and support bracket extend laterally from the mounting plate.

9. The modular projector cage of claim 1, wherein the bottom horizontal section includes first and second side bars and front and rear bars, wherein, during normal use, the front end of the mounting plate and the first and second articulated elevation assemblies do not directly contact the front bar.

10. A stacked frame, comprising:
    the modular projector cage of claim 1 as a first modular projector cage and another modular projector cage having rectangular hexahedral open frame and female connectors as a second modular projector cage;
    wherein the first and second modular projector cages are arranged in a stacked configuration such that male connectors of the first modular projector cage operably engage the female connectors of the second modular projector cage; and
    wherein retainer pins pass through the female connectors and engage the male connectors to releasably lock the respective rectangular hexahedral open frames of the first and second modular projector cages.

11. A modular projector cage for supporting an optical projector, comprising:
    a rectangular hexahedral open frame formed by tubes connected by corner fittings and having parallel top and bottom sections;
    a projector mounting plate configured to support the optical projector and having opposite sides and opposite front and rear ends and a centerline;
    first and second articulated elevation assemblies respectively mechanically connected to the opposite sides of the mounting plate at respective locations along the opposite sides between the centerline and the front end by respective first and second articulated mechanical connections each capable of articulated movement, and mechanically connected to the bottom section, the first and second articulated elevation assemblies being independently adjustable by respective first and second threaded rods to adjust an amount of pitch and an amount of roll of the mounting plate; and
    a yaw assembly operably connected to the mounting plate at a location between the centerline and the rear end via a mounting fixture having a threaded portion that engages a third threaded rod such that rotation of the third threaded rod generates an amount of a yaw of the mounting plate; and wherein generating the amount of yaw causes the articulated movement of the first and second articulated mechanical connections of the first and second articulated elevation assemblies;

further wherein at least one of the first and second articulated elevation assemblies include a support arm and a support bracket, the support arm extending from the mounting plate and rotatably coupled to the support bracket, thereby defining a first hinge that allows for rotation of the support arm and the support bracket about a first axis, wherein the support bracket is rotatably coupled to the bottom section thereby defining a second hinge that allows the support bracket to rotate around a second axis that is offset from and parallel to the first axis.

12. The modular projector cage of claim 11, wherein the first and second articulated elevation assemblies and the yaw assembly are each configured to maintain the mounting plate in a select orientation via frictional resistive forces when the optical projector is mounted on the mounting plate.

13. The modular projector cage of claim 11, wherein the first and second articulated elevation assemblies respectively include first and second bearing assemblies, the first and second threaded rods threadedly connecting the first and second bearing assemblies to respective first and second recess brackets of the tubes of the bottom section.

14. The modular projector cage of claim 11, wherein the mounting plate includes an open recess adjacent the rear end of the mounting plate, and wherein the yaw assembly includes:

a cross-tube having an interior, proximal and distal ends, and a slot generally midway between the proximal and distal ends;

wherein the third threaded rod runs through the interior of the cross-tube to beneath the slot;

a knob connected to an end of the third threaded rod such that rotation of the knob causes rotation of the third threaded rod;

a stem that upwardly extends from a base of the mounting fixture;

a spherical bearing that resides within the open recess and that receives the stem so that the stem can rotate therein;

a bearing retainer that retains the spherical bearing to the mounting plate; and wherein the rotation of the third threaded rod generates said amount of yaw adjustment.

15. The modular projector cage of claim 11, further comprising the optical projector mounted on the mounting plate.

16. A stacked frame, comprising:

the modular projector cage of claim 11 as a first modular projector cage and another modular projector cage having a rectangular hexahedral open frame and female connectors as a second modular projector cage;

wherein the first and second modular projector cages are arranged in a stacked configuration such that the male connectors of the first modular projector cage operably engage the female connectors of the second modular projector cage; and wherein retainer pins pass through the female connectors and engage the male connectors to releasably lock the respective rectangular hexahedral open frames of the first and second modular projector cages.

\* \* \* \* \*